United States Patent [19]
Kobayashi

[11] Patent Number: 5,969,225
[45] Date of Patent: Oct. 19, 1999

[54] ANGULAR-VELOCITY DETECTION APPARATUS

[75] Inventor: Shinji Kobayashi, Sagamihara, Japan

[73] Assignee: Murata Manufacturing Co., Ltd., Japan

[21] Appl. No.: 08/937,961

[22] Filed: Sep. 25, 1997

[30] Foreign Application Priority Data

Sep. 25, 1996 [JP] Japan .................................. 8-274025

[51] Int. Cl.⁶ ..................................................... G01P 9/04
[52] U.S. Cl. ........................................ 73/1.37; 73/504.12
[58] Field of Search ........................... 73/504.12, 504.14, 73/504.16, 1.37

[56] References Cited

U.S. PATENT DOCUMENTS 5,610,334  3/1997  Fima et al. ........................... 73/504.12

FOREIGN PATENT DOCUMENTS

| 638782 | 2/1995 | European Pat. Off. . |
| 709653 | 5/1996 | European Pat. Off. . |
| 1954279 | 5/1996 | Germany . |
| 8-148698 | 6/1996 | Japan . |

Primary Examiner—John E. Chapman
Attorney, Agent, or Firm—Ostrolenk, Faber, Gerb & Soffen, LLP

[57] ABSTRACT

The invention provides an angular-velocity detection apparatus, which includes a substrate (22) and a vibrating body (26) provided on the substrate (22), the vibrating body (26) being capable of displacing in a vibration axis direction and a detection axis direction which intersect at right angles to each other. A vibration generation section (33) is provided for vibrating the vibrating body (26) in the vibration axis direction by applying a driving signal, and a displacement detection section (34) is provided for detecting the amount of displacement of the vibrating body (26) when the vibrating body (26) is displaced in the detection axis direction on the basis of the angular velocity along a detected axis intersecting at right angles to the vibration axis and the detection axis in a state of the vibrating body (26) being vibrated in the vibration axis direction by the vibration generation direction (33). A corrective-vibration generation (35) is provided for causing the vibrating body (26) to vibrate for correction in the detection axis direction, thereby making it possible to reduce leakage vibration applied to the vibrating body (26) and to accurately detect the angular velocity Ω.

21 Claims, 8 Drawing Sheets

FIG. 8
PRIOR ART

ANGULAR-VELOCITY DETECTION APPARATUS

BACKGROUND OF THE INVENTION

1. Field of the Invention

The present invention relates to an angular-velocity detection apparatus which is suitably used to detect an angular velocity applied to, for example, a rotation member. More particularly, this invention provides an angular-velocity detection apparatus comprising a substrate, a vibrating body provided on the substrate, the vibrating body being capable of displacing in a vibration axis direction and a detection axis direction which intersect at right angles to each other, vibration generation means for vibrating the vibrating body in the vibration axis direction by applying a driving signal, and displacement detection means for detecting the amount of displacement of the vibrating body when the vibrating body is displaced in the detection axis direction on the basis of the angular velocity along a detected axis intersecting at right angles to the vibration axis and the detection axis in a state of the vibrating body being vibrated in the vibration axis direction by the vibration generation means.

2. Description of the Related Art

Generally, in angular-velocity detection apparatus, when a rotational force is applied about a Z axis which serves as a detected axis in a state in which a vibrating body is vibrated in the direction of a vibration axis in the three axes of X, Y and Z axes, a Coriolis force (inertial force) acts on the vibrating body, causing the vibrating body to vibrate in the direction of the Y axis which serves as a detection axis. Angular velocity detection apparatus which detect the displacement of the vibrating body in the direction of the Y axis due to this Coriolis force as an electrical charge generated in a piezoelectric member or as a change in a voltage, electrostatic capacitance or the like. Such an angular-velocity detection apparatus is disclosed in, for example, Japanese Unexamined Patent Publication (laid-open) No. 6-123632 (hereinafter referred to as "the prior art") is known.

An explanation of the prior art will now be given with reference to FIGS. 7 and 8.

Figure 7:
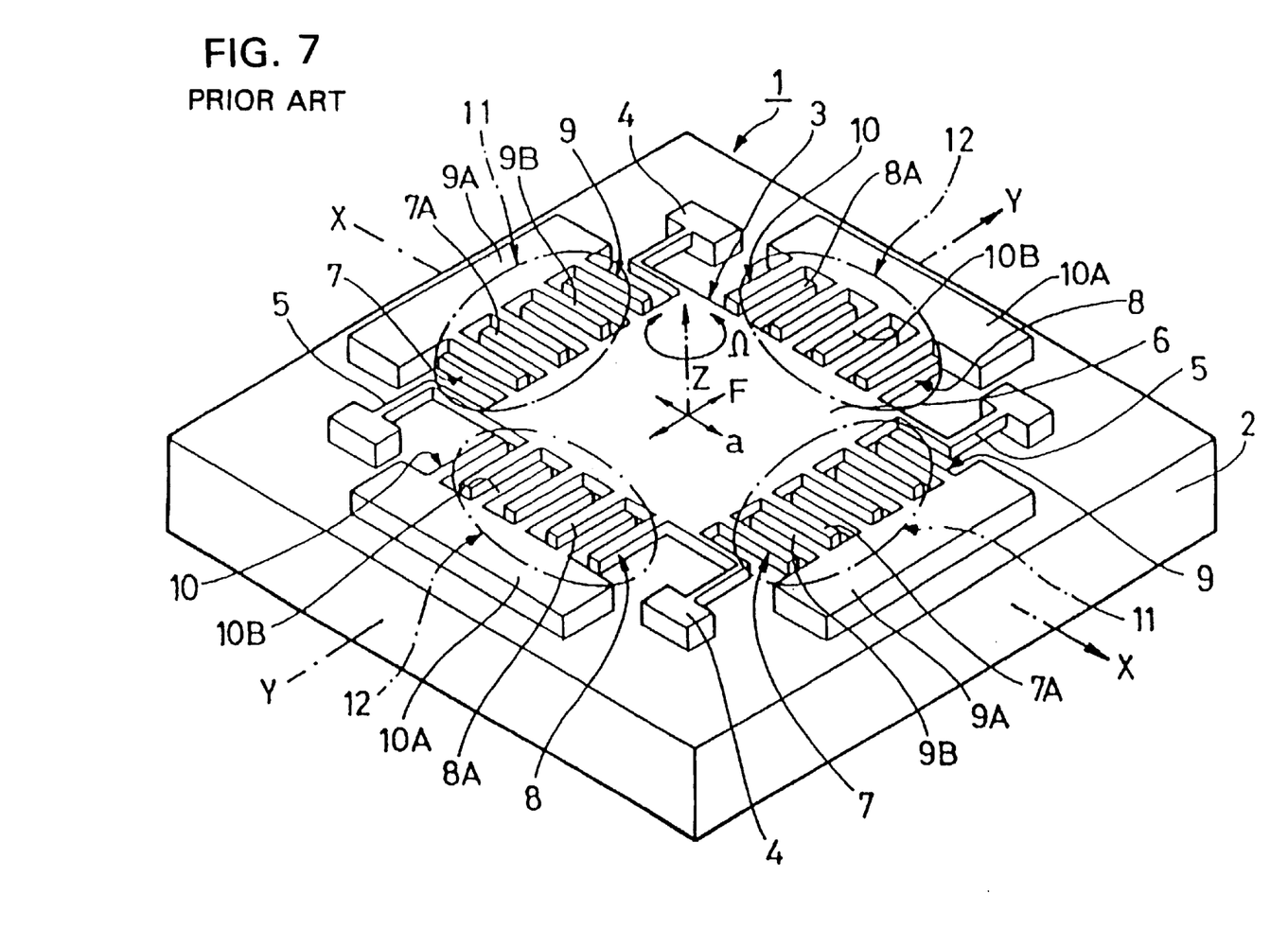
FIG. 7 is a perspective view illustrating a conventional angular-velocity detection element.
Figure 8:
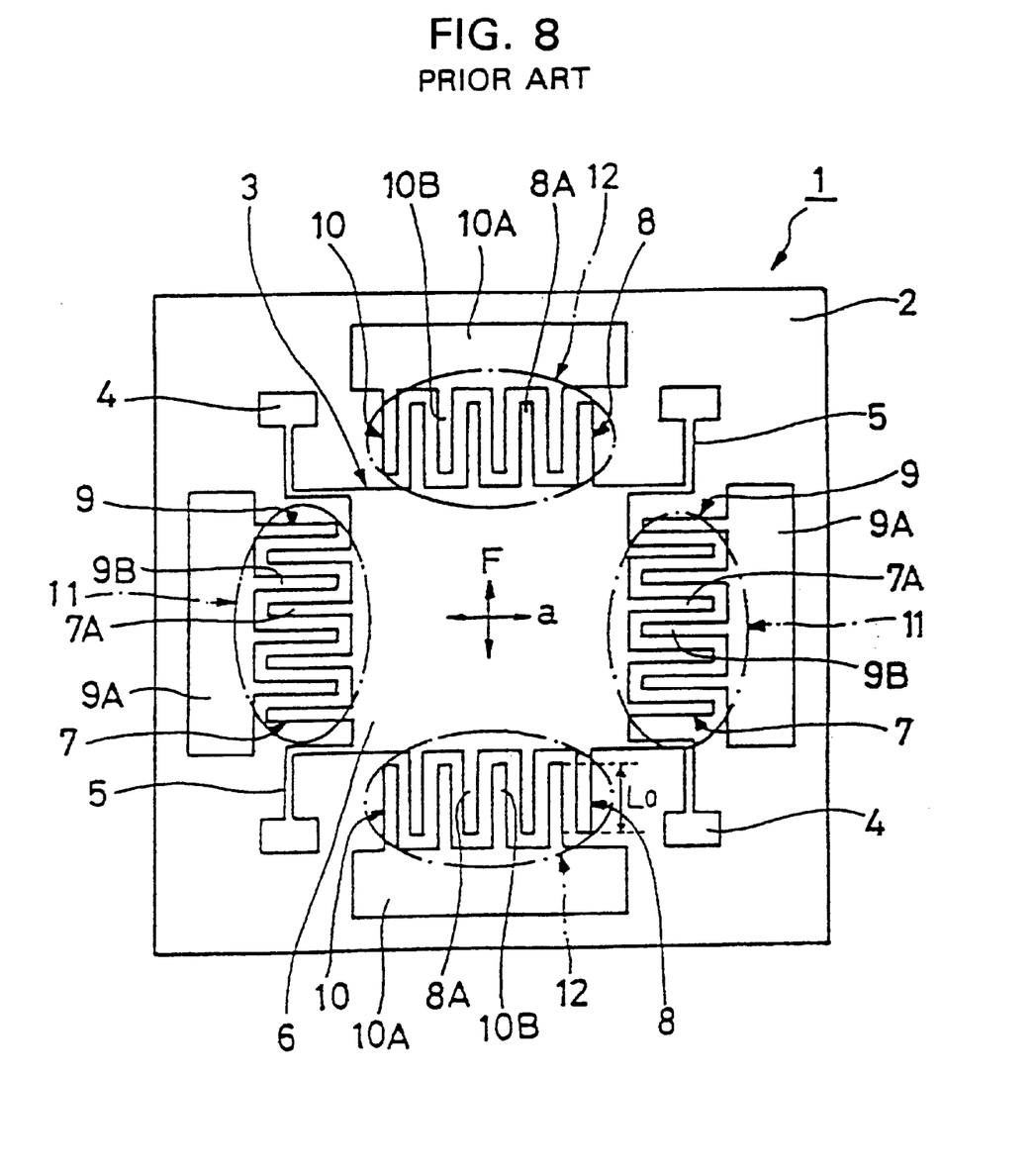
FIG. 8 is a plan view when the conventional angular-velocity detection element of FIG. 7 is viewed from the top.

In FIGS. 7 and 8, reference numeral 1 denotes an angular-velocity detection element of the prior art. Reference numeral 2 denotes a substrate formed in a rectangular shape, which forms the main body of the angular-velocity detection element 1, with the substrate 2 being formed of, for example, a high-resistance silicon material.

Reference numeral 3 denotes a movable section formed of low-resistance polysilicon, single-crystal silicon or the like having doped P, B, Sb or the like onto the substrate 2. The movable section 3 is formed of four support sections 4, 4, . . . provided on the substrate 2 so as to be positioned at the four corners of the substrate 2, four support beams 5, 5, . . . which are formed bent in the shape of the letter L in such a manner as to have a portion parallel to the X axis and a portion parallel to the Y axis from each support section 4 toward the central portion, and a rectangular vibrating body 6 which is supported by each support beam 5 in such a manner as to be capable of displacing in the X-axis and Y-axis directions and which is supported spacedly apart from the surface of the substrate 2. Electrodes 7 and 7 for vibration on the movable side, having provided therein a plurality of electrode plates 7A, 7A, . . . (four) in the shape of a comb, are protrusively provided on both siles of the left and right of the vibrating body 6, which is in the X-axis direction, and electrodes 8 and 8 for detection on the movable side, having provided therein a plurality of electrode plates 8A, 8A, . . . (four) in the shape of a comb, are protrusively provided on both siles of the front and back thereof, which is in the Y-axis direction.

In the movable section 3, only each support section 4 is fixedly secured to the substrate 2, and each support beam 5 and the vibrating body 6 are supported at four point in a state spaced apart by a predetermined amount from the substrate 2. Further, since each support beam 5 is formed in the shape of the letter L, by flexing the portion parallel to the Y axis, the vibrating body 6 can be displaced in the X-axis direction, and by flexing the portion parallel to the X axis, the vibrating body 6 can be displaced in the Y-axis direction.

Reference numerals 9 and 9 denote a pair of electrodes for vibration on the fixation side, provided on the substrate 2 in such a manner as to sandwich the vibrating body 6 from both sides of the right and left thereof. Each electrode 9 for vibration on the fixation side is formed of fixation sections 9A and 9A provided on the substrate 2 in such a manner as to be positioned on the right and left of the vibrating body 6, and four electrode plates 9B, 9B, . . . protrusively provided in the shape of a comb from each fixation section 9A in such a manner as to face with a gap each electrode plate 7A of the electrode 7 for vibration on the movable side.

Reference numerals 10 and 10 denote a pair of electrodes for detection on the fixation side, which are provided on the substrate 2 in such a manner as to sandwich the vibrating body 6 from both sides of the front and back thereof. Each electrode 10 for detection on the fixation side is formed of fixation sections 10A and 10A provided on the substrate 2 in such a manner as to be positioned on the front and back of the vibrating body 6, and four electrode plates 10B, 10B, . . . protrusively provided in the shape of a comb from each fixation section 10A in such a manner as to face with a gap each electrode plate 8A of the electrode 8 for detection on the movable side.

Reference numerals 11 and 11 denote vibration generation sections which serve as vibration generation means. Each vibration generation section 11 is formed of the electrode 7 for vibration on the movable side and the electrode 9 for vibration on the fixation side, with an equal gap being formed between each electrode plate 7A of the electrode 7 for vibration on the movable side and each electrode plate 9B of the electrode 9 for vibration on the fixation side. Here, if a driving signal of a frequency f at an opposite phase is applied between each electrode 7 for vibration on the movable side and each electrode 9 for vibration on the fixation side, an electrostatic attraction force is generated alternately between each electrode plate 7A and each electrode plate 9B positioned at left and between each electrode plate 7A and each electrode plate 9B positioned at right, and they come close to each other or move away from each other in each vibration generation section 11. This causes the vibrating body 6 to vibrate in the direction of the arrow a which is the X axis.

Reference numerals 12 and 12 denote displacement detection sections which serve as displacement detection means. Each displacement detection section 12 is formed of an electrode 8 for detection on the movable side and an electrode 10 for detection on the fixation side, with a facing length L0 being formed between each electrode plate 8A of the electrode 8 for detection on the movable side and each electrode plate 10B of the electrode 10 for detection on the fixation side. The electrodes 8 and 10 for detection are structured as parallel-plate capacitors for detection, and each displacement detection section 12 detects a change in the effective area between each electrode plate 8A and each electrode plate 10B as a change in the electrostatic capacitance.

In the angular-velocity detection element 1 structured as described above, if a driving signal of a frequency f at an opposite phase is applied to each vibration generation section 11, an electrostatic-attraction force alternately acts on the right and left vibration generation sections 11 and 11 between each electrode plate 7A and each electrode plate 9B, causing the vibrating body 6 to come close or move away in the direction of the arrow a and to vibrate.

In this state, when an angular velocity Ω about the Z axis is applied to the angular-velocity detection element 1, a Coriolis force (inertial force) is generated in the Y-axis direction, causing the vibrating body 6 to vibrate in the Y-axis direction by a Coriolis force F shown below at equation (2).

Here, a displacement x at which the vibrating body 6 is moved in the X-axis direction by each vibration generation section 11 and its velocity V are as in equation (1) below:

$$x = A\sin(\omega t)$$
$$V = A\omega\cos(\omega t) \quad (1)$$

where A is the amplitude of the vibrating body 6, ω is 2πf, and f is the frequency of the driving signal.

Further, the Coriolis force F in the Y-axis direction generated from the angular velocity Ω applied about the Z axis when the vibrating body 6 is vibrated in the X-axis direction at a displacement x and velocity V is as in equation (2) below:

$$F = 2m\Omega V \quad (2)$$
$$= 2m\Omega \times [A\omega\cos(\omega t)]$$

Then, the vibrating body 6 is vibrated in the direction of the Y axis by the Coriolis force F of equation (2), and the vibration displacement by this vibrating body 6 is detected by each displacement detection section 12 as the change of the electrostatic capacitance between the electrode 8 for detection on the movable side and the electrode 10 for detection on the fixation side, making it possible to detect the angular velocity Ω about the Z axis.

Since each vibration generation section 11 is formed of the electrode 7 for vibration on the movable side formed of each electrode plate 7A and the electrode 9 for vibration on the fixation side formed of each electrode plate 9B, it is possible to secure a large effective area where the electrodes 7 and 9 for vibration face each other. As a result, when a driving signal is applied to each vibration generation section 11, an electrostatic attraction force generated between each electrode plate 7A and each electrode plate 9B is increased to vibrate the vibrating body 6 in the direction of the arrow a.

Meanwhile, since each displacement detection section 12 is formed of the electrode 8 for detection on the movable side formed of each electrode plate 8A and the electrode 10 for detection on the fixation side formed of each electrode plate 10B, it is possible to increase the effective area where the electrodes 8 and 10 for detection face each other. As a result, it is possible to detect the amount of the displacement of the vibrating body 6 which is displaced in the Y-axis direction by each displacement detection section 12 as a change in the effective area between each electrode plate 8A and each electrode plate 10B, i.e., a change in the electrostatic capacitance.

In the above-described angular-velocity detection element 1 of the prior art, the Coriolis force generated by the angular velocity Ω about the Z axis is very small, and therefore, it is necessary to generate a large displacement by using the resonance in the Y-axis direction. Meanwhile, to increase the Coriolis force, as even can be understood from equation (2), since the velocity V during vibration must be increased, a frequency near the resonance frequency in the X-axis direction is used as the frequency of the driving signal. Therefore, reaching a state close to the resonance frequency even at the vibration conditions in the Y-axis direction which serves as a detection axis is required to increase sensitivity.

However, if the resonance frequency in the detection direction is made to come close to the resonance frequency in the driving direction as described above, a part of the driving signal leaks (what is commonly called crosstalk) in the detection direction via the parasitic capacitance of the substrate 2 or the like. Then, this driving signal which leaked is applied to each displacement detection section 12, an electrostatic attraction force is generated between the electrode 8 for detection on the movable side and the electrode 10 for detection on the fixation side, and even in a state in which the angular velocity Ω does not act, vibration (hereinafter referred to as leakage vibration) appears in the vibrating body 6, presenting a problem of causing noise.

SUMMARY OF THE INVENTION

The object of the present invention is to overcome the above-described problems of the prior art by providing an angular-velocity detection apparatus which is capable of eliminating components which may cause noise and increasing the angular-velocity detection accuracy.

The invention provides an angular-velocity detection apparatus of the above mentioned kind, which is characterized in that corrective-vibration generation means for causing the vibrating body to vibrate for correction in the detection axis direction is provided.

With the above angular-velocity detection apparatus, even when a leakage vibration occurs by which the vibrating body is displaced in the detection-axis direction due to the influence of a driving signal applied to the vibration generation means when an angular velocity is not applied about the detected axis, it is possible to suppress the leakage vibration of the vibrating body in the detection-axis direction by generating a corrective-vibration which opposes a leakage vibration of the vibrating body. The corrective-vibration is generated by applying a correction signal to the corrective-vibration generation means.

In the above angular-velocity detection apparatus, a correction signal applied to the corrective-vibration generation means may have the same frequency as that of the driving signal applied to the vibration generation means and may have a phase different from that of the driving signal. Further, the correction signal may have an amplitude different from that of the driving signal.

As in the above angular-velocity detection apparatus, when an angular velocity is not applied about the detected axis, a leakage vibration which occurs in the vibrating body is generated by the driving signal applied to the vibration generation means. Therefore, by inputting a correction signal which has the same frequency as that of the driving signal and which is at a phase different from the driving signal, it is possible to cancel the leakage vibration by the corrective-vibration which occurs in the vibrating body.

In the above angular-velocity detection apparatus, there may be provided that self-diagnostic means which causes the vibrating body to displace in the detection axis direction by inputting the correction signal and determines whether or not the vibrating body operates normally on the basis of a relationship between the correction signal and the displacement of the vibrating body in the detection axis direction when it is determined that an angular velocity is not applied on the basis of a detection signal from the displacement detection means.

As in the above angular-velocity detection apparatus, when it is determined that an angular velocity has not been applied, the vibrating body is displaced in the detection-axis direction by the correction signal input to the corrective-vibration generation means, and this displacement is detected by the displacement detection means. Then, the self-diagnostic means determines whether or not the displacement of this vibrating body in the detection-axis direction falls within the preset displacement range in which the vibrating body is assumed to be normal, and is able to perform a self-diagnosis of whether the vibrating body is operating normally.

The above and further objects, aspects and novel features of the invention will become more apparent from the following detailed description when read in connection with the accompanying drawings.

DESCRIPTION OF THE PREFERRED EMBODIMENTS

In the description of the embodiments, components which are the same as those of the prior art are given the same reference numerals and therefore, a description thereof has been omitted.

First, FIGS. 1 through 4 show a first embodiment of the present invention. Reference numeral 21 denotes an angular-velocity detection element which constitutes an angular-velocity detection apparatus in accordance with this embodiment. Reference numeral 22 denotes a substrate formed in a rectangular shape, which forms the main body of the angular-velocity detection element 21, with the substrate 22 being formed of, for example, a high-resistance silicon material.

Figure 1:
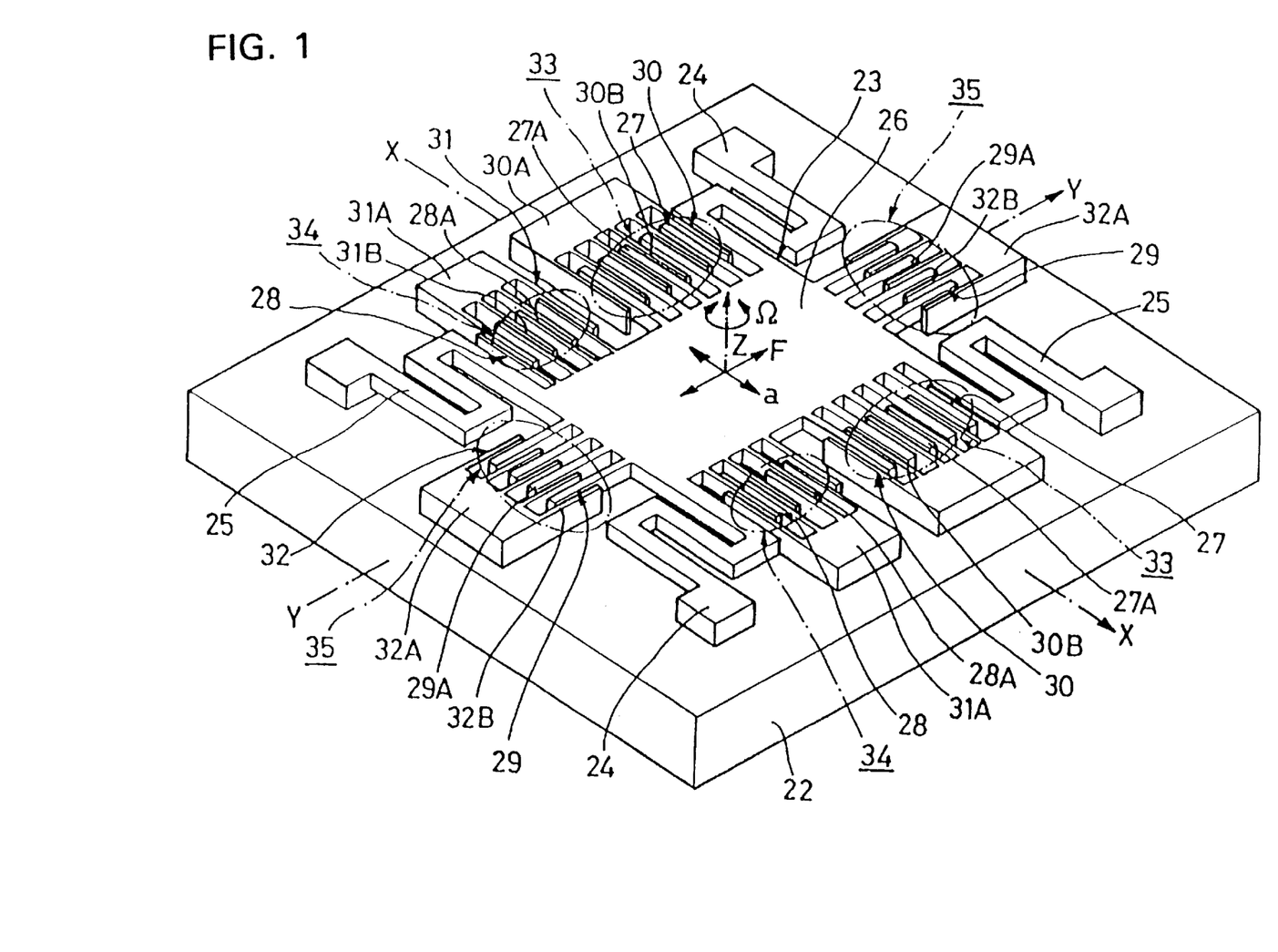
FIG. 1 is a perspective view illustrating an angular-velocity detection element which constitutes an angular velocity detection apparatus according to a first embodiment.
Figure 2:
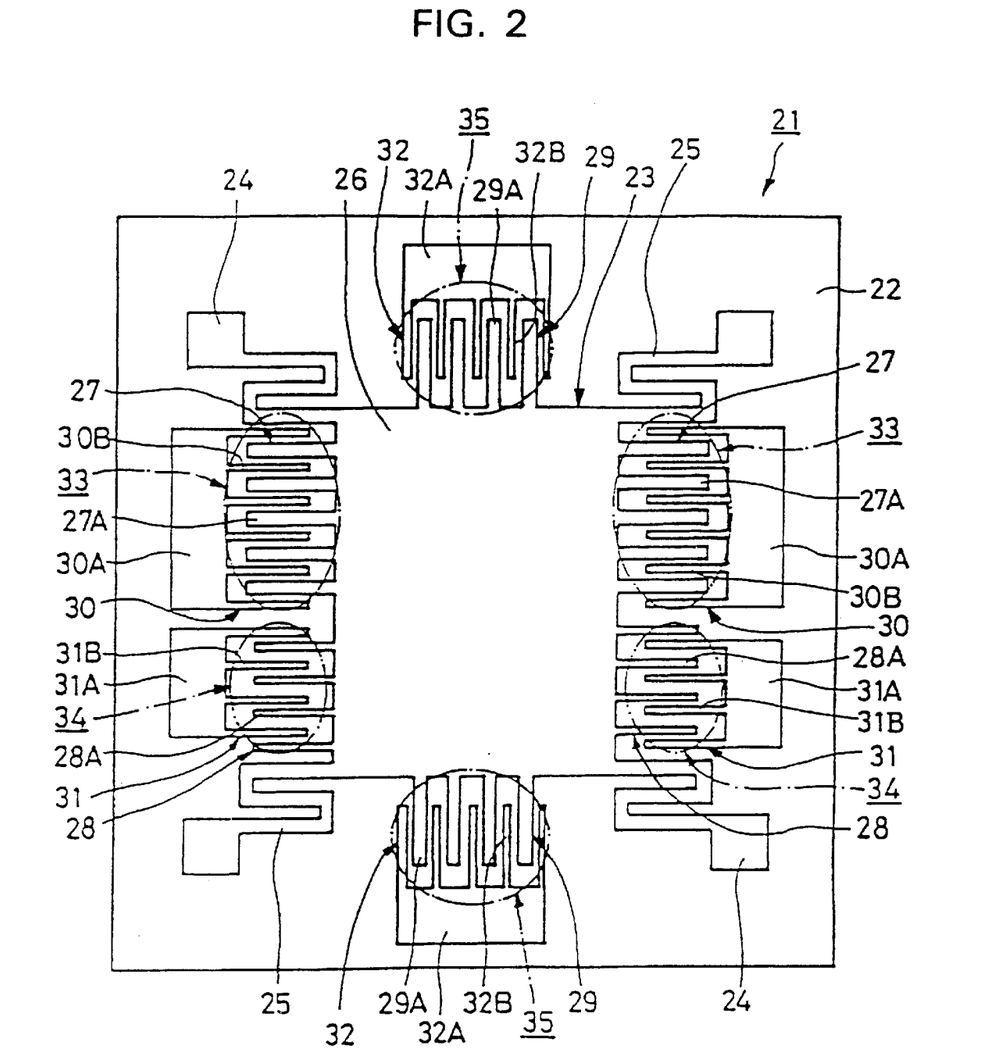
FIG. 2 is a plan view when the angular-velocity detection element of FIG. 1 is viewed from the top.

Reference numeral 23 denotes a movable section formed of low-resistance polysilicon, single-crystal silicon or the like having doped P, B, Sb or the like onto the substrate 22. The movable section 23, substantially similar to the movable section 3 of the prior art, is formed of four support sections 24, 24, . . . provided on the substrate 22 so as to be positioned at the four corners of the substrate 22, four support beams 25, 25, . . . which are formed bent in the shape of the letter S in such a manner as to have a portion parallel to the X axis and a portion parallel to the Y axis from each support section 24 toward the central portion, and a rectangular vibrating body 26 which is supported by each support beam 25 in such a manner as to be capable of displacing in the X-axis and Y-axis directions and which is supported spacedly apart from the surface of the substrate 22. Electrodes 27 and 27 for vibration on the movable side, having provided therein a plurality of electrode plates 27A, 27A, . . . (five) in the shape of a comb, are protrusively provided in the rear portion on both sides of the left and right of the vibrating body 26, which is in the X-axis direction, and electrodes 28 and 28 for detection on the movable side, having provided therein a plurality of electrode plates 28A, 28A, . . . (four) in the shape of a comb, are protrusively provided in the front portion on both sides of the front and back of the vibrating body 26, which is in the Y-axis direction. Further, electrodes 29 and 29 for corrective vibration on the movable side, having provided therein a plurality of electrode plates 29A, 29A, . . . (four) in the shape of a comb, are protrusively provided on both sides of the left and right, which is in the Y-axis direction.

Then, in the movable section 23, only each support section 24 is fixedly secured to the substrate 22, and each support beam 25 and the vibrating body 26 are supported at four points in a state spaced apart by a predetermined amount from the substrate 22. Further, since each support beam 25 is formed in the shape of the letter S, by flexing the portion parallel to the Y axis, the vibrating body 26 can be displaced in the X-axis direction, and by flexing the portion parallel to the X axis, the vibrating body 26 can be displaced in the Y-axis direction.

Reference numerals 30 and 30 denote a pair of electrodes for vibration on the fixation side, provided on the substrate 22 in such a manner as to be positioned in the rear portion of both sides of the right and left of the vibrating body 26 and sandwich the vibrating body 26. Each electrode 30 for vibration on the fixation side is formed of fixation sections 30A and 30A provided on the substrate 22 in such a manner as to be positioned on the right and left of the vibrating body 26, and six electrode plates 30B, 30B, . . . protrusively provided in the shape of a comb from each fixation section 30A in such a manner as to face with a gap each electrode plate 27A of the electrode 27 for vibration on the movable side.

Reference numerals 31 and 31 denote a pair of electrodes for detection on the fixation side, provided on the substrate 22 in such a manner as to be positioned in the front portion of both sides of the right and left of the vibrating body 26 and sandwich the vibrating body 26. Each electrode 31 for detection on the fixation side is formed of fixation sections 31A and 31A provided on the substrate 22 in such a manner as to be positioned on the right and left of the vibrating body 26, and four electrode plates 31B, 31B, . . . protrusively provided in the shape of a comb from each fixation section 31A in such a manner as to face with a gap each electrode plate 28A of the electrode 28 for detection on the movable side.

Reference numerals 32 and 32 denote a pair of electrodes for corrective vibration on the fixation side, provided on the substrate 22 in such a manner as to be positioned on both sides of the front and back of the vibrating body 26 and sandwich the vibrating body 26. Each electrode 32 for corrective vibration on the fixation side is formed of fixation sections 32A and 32A provided on the substrate 22 in such a manner as to be positioned on the front and back of the vibrating body 26, and five electrode plates 32B, 32B, . . . protrusively provided in the shape of a comb from each fixation section 32A in such a manner as to face with a gap each electrode plate 29A of the electrode 29 for corrective vibration on the movable side.

Reference numerals 33 and 33 denote vibration generation sections which serve as vibration generation means. Each vibration generation section 33 is formed of the electrode 27 for vibration on the movable side and the electrode 30 for vibration on the fixation side, with an equal gap being formed between each electrode plate 27A of the electrode 27 for vibration on the movable side and each electrode plate 30B of the electrode 30 for vibration on the fixation side. Here, if a driving signal Vd of a predetermined frequency f at an opposite phase is applied between each electrode 27 for vibration on the movable side and each electrode 30 for vibration on the fixation side, an electrostatic attraction force is generated alternately between each electrode plate 27 and each electrode plate 30 positioned at left and between each electrode plate 27A and each electrode plate 30B positioned at right, and they come close to each other or move away from each other in each vibration generation section 33. This causes the vibrating body 26 to vibrate in the direction of the arrow a which is the X axis.

Reference numerals 34 and 34 denote displacement detection sections which serve as displacement detection means. Each displacement detection section 34 is formed of the electrode 28 for detection on the movable side and an electrode 31 for detection on the fixation side, with a different adjacent gap dimension being formed between each electrode plate 28A of the electrode 28 for detection on the movable side and each electrode plate 31B of the electrode 31 for detection on the fixation side. The electrodes 28 and 31 for detection are structured as parallel-plate capacitors for detection, and each displacement detection section 34 detects a change in the effective distance between each electrode plate 28A and each electrode plate 31B as a change in the electrostatic capacitance.

Reference numerals 35 and 35 denote corrective-vibration generation sections which serve as corrective-vibration generation means. Each corrective vibration generation section 35 is formed of the electrode 29 for corrective vibration on the movable side and the electrode 32 for corrective vibration on the fixation side, with an equal gap being formed between each electrode plate 29A of the electrode 29 for corrective vibration on the movable side and each electrode plate 32B of the electrode 32 for corrective vibration on the fixation side. Here, by inputting a correction signal Vr having the same frequency as that of the driving signal Vd between each electrode 29 for corrective vibration on the movable side and each electrode 32 for corrective vibration on the fixation side in order to cause an electrostatic attraction force to be generated alternately between each electrode plate 29A and each electrode plate 32B, the vibrating body 26 can be corrective-vibrated in the Y-axis direction.

Next, referring to FIG. 3, the construction of an electrical circuit added to the angular-velocity detection element 21 will be described.

Figure 3:
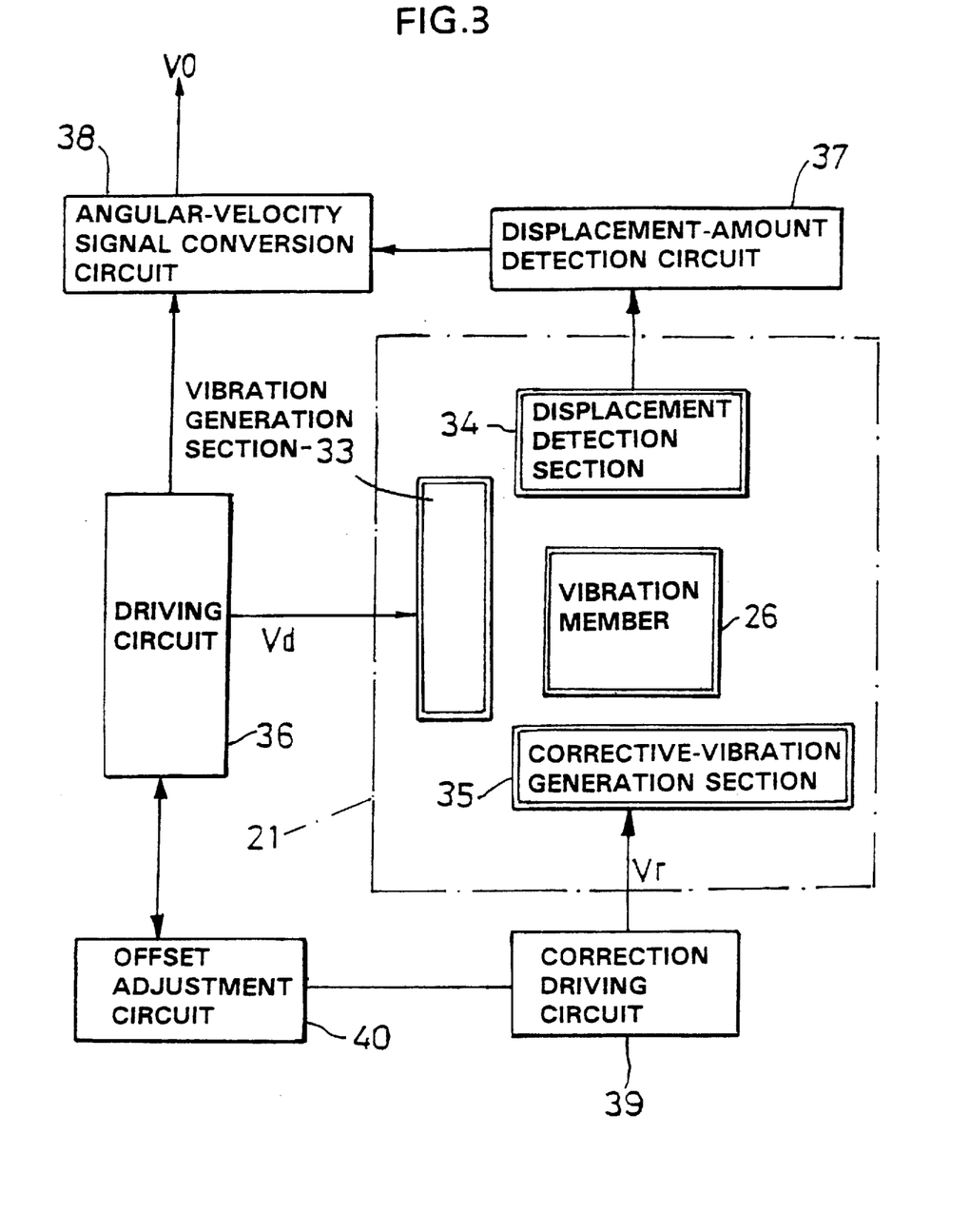
FIG. 3 is a block diagram illustrating the overall construction of the angular velocity detection apparatus according to the first embodiment.

In FIG. 3, reference numeral 36 denotes a driving circuit. The driving circuit 36 is formed of an vibrating body which generates a sine wave of a predetermined frequency f and an amplifier circuit which adjusts the amplitude of a sine wave. Here, a driving signal Vd of a frequency f is applied to the vibration generation section 33. The applied driving signal Vd acts on the electrode 27 for vibration on the movable side and the electrode 30 for vibration on the fixation side, which constitute the vibration generation section 33, and the electrostatic attraction force between each electrode plate 27A and each electrode plate 30B causes the vibrating body 26 to vibrate in the vibration-axis (X axis) direction. The driving circuit 36 is capable of adjusting the amplitude of the vibrating body 26 in the vibration-axis direction by adjusting the amplitude of the driving signal Vd.

Reference numeral 37 denotes a displacement-amount detection circuit. The displacement-amount detection circuit 37 detects the displacement of the vibrating body 26 in the detection-axis (Y axis) direction, namely, a change in the spacing dimension between the electrode 28 for detection on the movable side and the electrode 31 for detection on the fixation side, which constitute the displacement detection section 34, as a change in the electrostatic capacitance and converts this detection signal into a voltage.

Reference numeral 38 denotes an angular-velocity signal conversion circuit, with the driving circuit 36 and the displacement-amount detection circuit 37 being connected to the input side of the angular-velocity signal conversion circuit 38. The angular-velocity signal conversion circuit 38 corrects the deviation of the phase or the like on the basis of the driving signal Vd output from the driving circuit 36 and the detection signal output from the displacement-amount detection circuit 37 and outputs the signal as an output signal Vo corresponding to the angular velocity Ω to an external source.

Reference numeral 39 denotes a correction driving circuit. The correction driving circuit 39 applies to the corrective-vibration generation section 35 a correction signal Vr whose phase is shifted at a frequency f in accordance with a signal output from an offset adjustment circuit 40, which will be described later. The correction signal Vr input to the corrective-vibration generation section 35 becomes a waveform reverse to the amplitude of the leakage vibration of the vibrating body 26 generated in the detection-axis (Y axis) direction when an angular velocity is not applied about the detected axis (Z axis) in a state in which the vibrating body 26 is vibrated in the vibration-axis (X axis) direction in the final step before shipment of the angular-velocity detection apparatus.

Reference numeral 40 denotes an offset adjustment circuit. The offset adjustment circuit 40, formed of a phase adjustment circuit, an amplitude adjustment circuit and the like, transmits/receives signals between the offset adjustment circuit 40 and the driving circuit 36 and outputs signals to the correction driving circuit 39. Further, the offset adjustment circuit 40 is formed of adjustment means, such as a variable resistor and a variable capacitor. The offset adjustment circuit 40 monitors the output signal Vo output from the angular-velocity signal conversion circuit 38 when an angular velocity is not applied about the detected axis (Z axis) in a state in which the vibrating body 26 is vibrated in the vibration-axis (X axis) direction in the final step and causes the adjustment means to set the phase difference and the amplitude of the correction signal so that the output signal Vo becomes zero.

The angular-velocity detection apparatus according to this embodiment is formed of the angular-velocity detection element 21 and the above-described electrical circuit. The basic operation thereof is such that a driving signal Vd is applied from the driving circuit 36 to the vibration generation section 33, causing the vibrating body 26 to vibrate as indicated by the arrow a in the X-axis direction which is a vibration axis, and when an angular velocity Ω is applied about the Z axis which is a detected axis with the vibrating body 26 being vibrated in the vibration-axis direction, the vibrating body 26 is vibrated in the Y-axis direction which is a detection axis by a Coriolis force. Then, the vibration displacement of the vibrating body 26 in the detection-axis direction is detected as a change in the electrostatic capacitance between the electrode 28 for detection on the movable side and the electrode 31 for detection on the fixation side, and this detection signal is output as an output signal Vo corresponding to the angular velocity Ω via the displacement-amount detection circuit 37 and the angular-velocity signal conversion circuit 38.

Next, the vibration operation of the vibrating body 26 will be considered. Generally, when a displacement in two-axis directions is used, a model therefor can be shown as in FIG. 4. That is, the vibrating body 26 is supported in the X-axis direction, which is the vibration-axis direction, by two springs having a spring constant of $k_x/2$ and is supported in the Y-axis direction, which is the detection-axis direction, by two springs having a spring constant of $k_y/2$.

Figure 4:
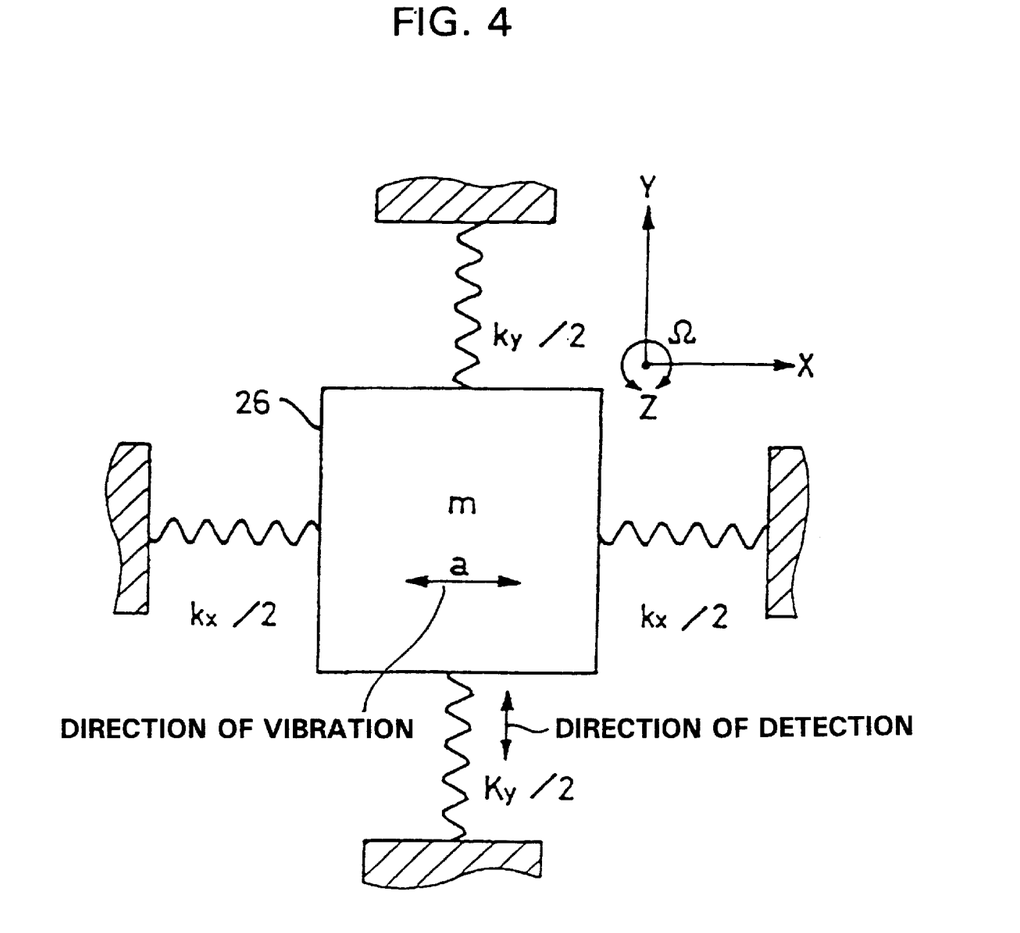
FIG. 4 shows the vibration state of a vibrating body through the use of a model.

Then, in this embodiment, as described earlier, the driving signal Vd which is a sine wave of a frequency f is fed to each vibration generation section 33, causing the vibrating body 26 to vibrate in the vibration-axis (X axis) direction. When an angular velocity Ω about the Z axis is applied in a state in which vibration in the form of a sine wave is performed, the vibrating body 26 is displaced in the detection-axis (Y axis) direction by a Coriolis force.

However, as described in regard to the problems of the prior art, in spite of the fact that an angular velocity Ω about the Z axis is not applied to the vibrating body 26, the vibrating body 26 has been displaced in the Y-axis direction due to leakage vibration. When these operations are expressed by an equation of motion, the equation of motion in the X-axis direction can be represented by equation (3) below:

$$m\ddot{x}+cx\,\dot{x}+kx\,x+2m\Omega\dot{y}=Fx\exp(j\omega t) \quad (3)$$

where cx is the attenuation coefficient in the X-axis direction, and Fx is the magnitude of the driving force in the X-axis direction.

Also, the equation of motion in the Y-axis direction is as shown in equation (4) below:

$$m\ddot{y}+cx\,\dot{y}+ky\,y-2m\Omega\dot{x}=Fy\exp[j(\omega t+\phi)] \quad (4)$$

where cy is the attenuation coefficient in the Y-axis direction, Fy is the magnitude of the driving force in the Y-axis direction, and φ is the phase difference between the driving force in the X-axis direction and the effective driving force in the Y-axis direction.

Here, the term in which Ω in the above-described equations (3) and (4) is accumulated is a term in which an influence of the Coriolis force is received, and since there is no leakage of vibration energy if the vibrating body 26 is accurately vibrated in the X-axis direction, the magnitude Fy of the driving force in the Y-axis direction becomes zero. However, as described in regard to the prior art, since, in practice, Fy is a finite value due to the influence of leakage vibration, the S/N ratio of the output signal Vo is decreased and noise, such as temperature drift, is superposed.

Next, the displacement Y of the vibrating body 26 in the Y-axis direction when corrective-vibration is applied from the corrective-vibration generation section 35 can be derived as equation (5) below on the basis of the above-described equations (3) and (4):

$$Y=\alpha Fx\Omega\,\cos(\omega t+\phi_1)+\beta Fy\,\cos(\omega t+\phi_2)+\gamma\Delta F\,\cos(\omega t+\phi_3) \quad (5)$$

Since α, β and γ in the respective terms can be expressed by ω and the coefficients shown in equations (3) and (4), they are abbreviated as coefficients α, β and γ. Further, $\phi_1$ and $\phi_2$ are expressed similarly as variables, and $\phi_3$ is also dependent on the phase of the driving force in the Y-axis direction. Further, the displacement Y in equation (5) is such that the displacement y of the vibrating body 26 in the Y-axis direction and the error contained in the output signal Vo in the circuit are considered, and is shown for the output signal Vo and the angular velocity Ω output from the angular-velocity detection apparatus.

Here, a description will be given of equation (5). The first term indicates the amount of displacement which the vibrating body 26 is displaced in the Y-axis direction by the Coriolis force, and if the other second and third terms are zero and there is only this first term, detection can be performed as the displacement Y with no error which opposes the angular velocity Ω.

Next, the second term indicates the amount of vibration due to leakage caused by the parasitic capacitance of the substrate 22 and is an invariable amount determined by the mechanical construction and the construction of the electrical circuit of the angular-velocity detection element 21.

Further, the third term indicates corrective-vibration of the vibrating body 26, which is generated by the corrective-vibration generation section 35. A correction signal Vr applied to the corrective-vibration generation section 35 becomes as in equation (6) below on the basis of this third term:

$$Vr\,\Delta F\,\cos(\omega t+\phi_3) \quad (6)$$

Therefore, the correction signal Vr applied from the correction driving circuit 39 to the corrective-vibration generation section 35 has the same frequency f as that of the driving signal Vd and becomes such that ΔF and $\phi_3$ can be adjusted, that is, the amplitude and the phase difference can be adjusted. As a result, by adjusting the correction signal Vr, the second term and the third term in equation (5) can be cancelled in respect of each other, and equation (5) indicates a displacement only in the detection-axis direction by the Coriolis force of the first term.

Thus, in the angular-velocity detection apparatus in accordance with this embodiment, in the angular-velocity detection element 21 which constitutes the angular-velocity detection apparatus, by applying to each corrective-vibration generation section 35 a correction signal Vr different from the driving signal Vd applied to each vibration generation section 33, the vibrating body 26 is made to generate corrective-vibration in the detection-axis direction regardless of the presence or absence of the angular velocity Ω about the Z axis. Therefore, it is possible to suppress leakage vibration which occurs in the detection-axis direction of the vibrating body 26 by corrective-vibration.

Further, in the adjustment of the correction signal Vr, in the final step of the angular-velocity detection apparatus, the amplitude of the correction signal Vr and the phase difference are set so as to make the output signal Vo zero by adjusting the adjustment means of the offset adjustment circuit while the leakage vibration of the vibrating body 26 when the angular velocity Ω is not applied about the detected axis is monitored by the output signal Vo from the angular-velocity signal conversion circuit 38 in a state in which the driving signal Vd is applied to each vibration generation section 33 from the driving circuit 36 in order to cause the vibrating body 26 to be vibrated in the vibration direction.

As a result, the leakage vibration of the vibrating body 26 can be cancelled by the corrective-vibration applied to the vibrating body 26 from each corrective-vibration generation section 35, the leakage vibration can be suppressed, and when the angular velocity Ω is not applied, the vibrating body 26 can be vibrated only in the vibration-axis direction. Further, since the adjustment of the corrective-vibration which suppresses the leakage vibration which occurs in the vibrating body 26 is set on the basis of the output signal Vo output from the angular-velocity signal conversion circuit 38, even the amount of error which occurs from the circuit added to the angular-velocity detection element 21 can be eliminated. As a result, when the angular velocity Ω about the detected axis (Z axis) is applied, it is possible to cause the vibrating body 26 to vibrate in the detection-axis direction by only the Coriolis force caused by this angular velocity Ω, making it possible to accurately detect the angular velocity Ω and to increase detection sensitivity.

Further, by forming the correction signal Vr applied to each of the corrective-vibration generation sections 35 into a sine wave which has the same frequency as that of the driving signal Vd and which is different in its amplitude and phase difference therefrom, leakage vibration can be surely cancelled, as shown in equation (5).

Thus, in the angular-velocity detection apparatus in accordance with this embodiment, since leakage vibration which occurs in the vibrating body 26 is cancelled by applying a correction signal Vr to the corrective-vibration generation section 35 in order to cause the vibrating body 26 to generate corrective-vibration, it is possible to accurately detect the angular velocity Ω about the detected axis and to increase the reliability of the apparatus. Furthermore, since corrective-vibration is set for each angular-velocity detection apparatus, it is possible to prevent variations due to manufacturing errors or the like for each angular-velocity detection element 21 and to improve the yield.

Further, in this embodiment, since leakage vibration which occurs in the vibrating body 26 is removed when the vibrating body 26 is in a vibrating state, it is possible to prevent a displacement of the vibrating body 26 in the detection-axis direction due to leakage vibration of the vibrating body 26 from being detected by each displacement detection section 34 and possible to obviate an external circuit for correcting the output signal Vo.

Figure 5:
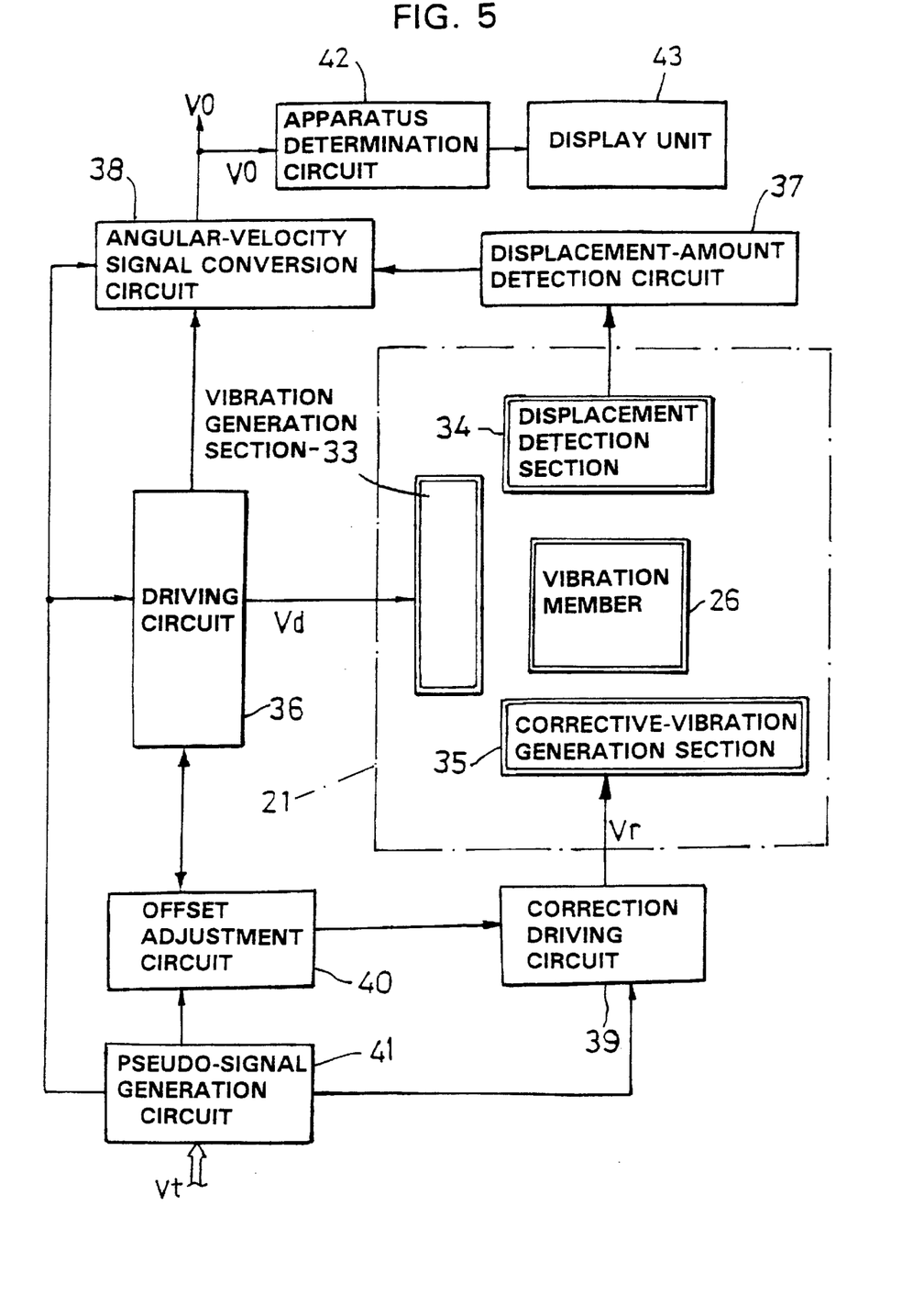
FIG. 5 is a block diagram illustrating the overall construction of an angular velocity detection apparatus according to a second embodiment.
Figure 6:
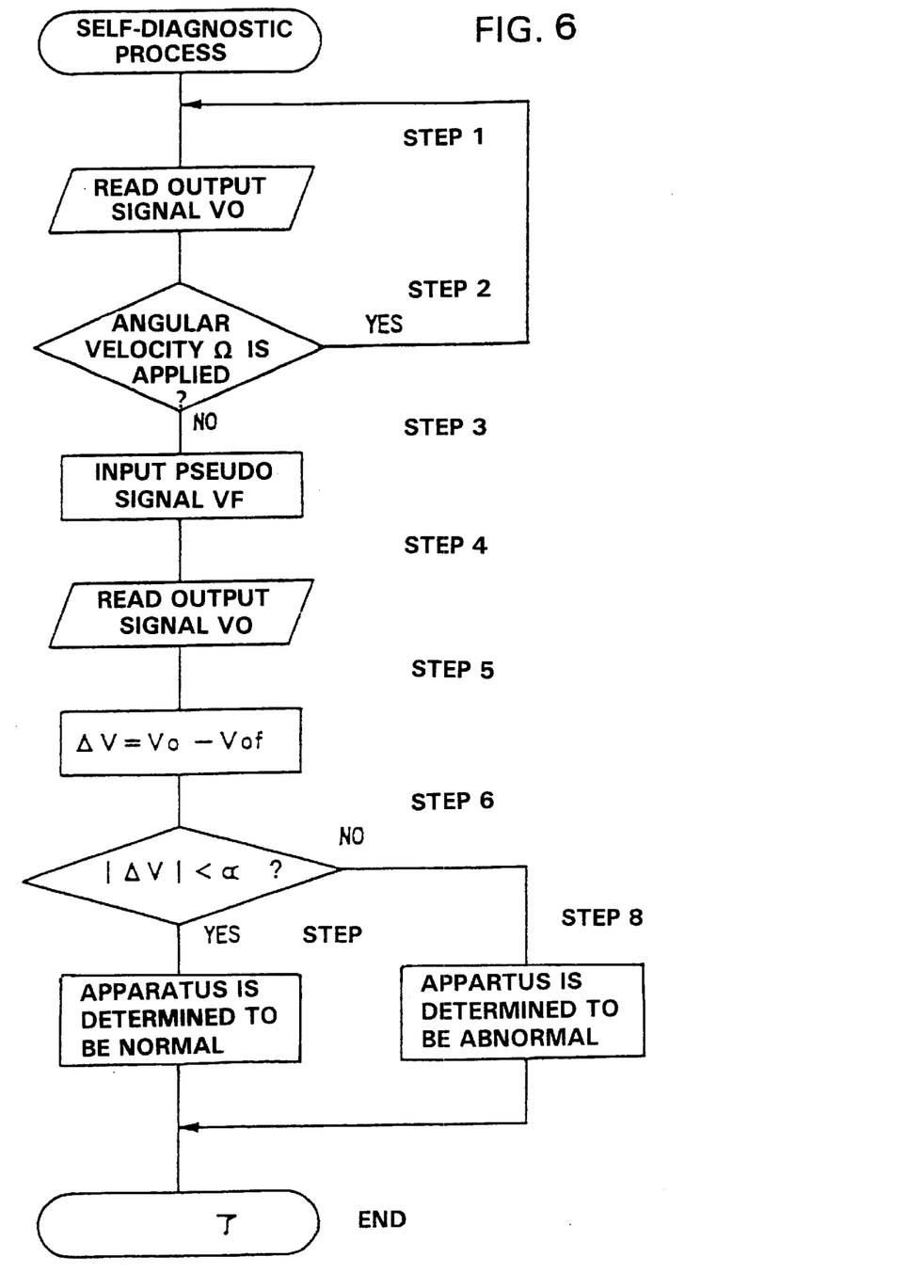
FIG. 6 is a flowchart illustrating a self-diagnostic process according to the second embodiment.

Next, a second embodiment of the present invention is shown in FIGS. 5 and 6. The feature of this embodiment is that a self-diagnostic function is provided which causes a vibrating body to be displaced in the detection-axis direction by inputting a predetermined correction signal when an angular velocity is not applied and which determines whether or not the vibrating body 26 is operating normally on the basis of the relationship at this time between the correction signal and the displacement.

Components in the second embodiment which are the same as those of the above-described first embodiment are given the same reference numerals and therefore, a description thereof has been omitted.

In FIG. 5, reference numeral 41 denotes a pseudo-signal generation circuit used for self-diagnoses, with the output side of the pseudo-signal generation circuit 41 being connected to the driving circuit 36, the angular-velocity signal conversion circuit 38, the offset adjustment circuit 40 and the correction driving circuit 39 and a self-diagnostic signal Vt being input to the input side from an external control unit (not shown). When the self-diagnostic signal Vt is input to the pseudo-signal generation circuit 41, a signal is input from the pseudo-signal generation circuit 41 to the correction driving circuit 39, and a pseudo signal Vf which is a predetermined correction signal of a DC voltage is fed from the correction driving circuit 39 to the corrective-vibration generation section 35.

Reference numeral 42 denotes an apparatus determination circuit, with the angular-velocity signal conversion circuit 38 being connected to the input side of the apparatus determination circuit 42 and a display unit 43 being connected to the output side. The apparatus determination circuit 42 is formed of a subtraction circuit, a comparator circuit and the like, which are not shown. An output signal VOf corresponding to the pseudo signal Vf is set in the subtraction circuit, and a determination value a for determining whether or not the operation of the vibrating body 26 is normal is set as a voltage value in the comparator circuit.

Next, the operation of the apparatus determination circuit 42 will be described with reference to the flowchart of a self-diagnoses process in FIG. 6.

Initially, in step 1, the displacement of the vibrating body 26 in the detection-axis direction is read as the output signal Vo into the apparatus determination circuit 42 via the displacement-amount detection circuit 37 and the angular-velocity signal conversion circuit 38. In step 2, a check is made to determine if this output signal Vo is a signal corresponding to the displacement caused by the angular velocity Ω about the Z axis. In the case of "YES", since the angular velocity Ω has been applied, the process of steps 1 and 2 is repeated until a state is reached in which the angular velocity Ω is not applied. When it is determined to be "NO" in step 2, the process proceeds to step 3.

In step 3, a self-diagnostic signal Vt is input to the pseudo-signal generation circuit 41 from the external control unit, and a signal is input from the pseudo-signal generation circuit 41 to the driving circuit 36, the angular-velocity signal conversion circuit 38, the offset adjustment circuit 40 and the correction driving circuit 39. Then, the pseudo signal Vf is input from the correction driving circuit 39 to the corrective-vibration generation section 35, and the vibrating body 26 is displaced in the detection-axis (Y axis) direction.

In the subsequent step 4, the displacement of the vibrating body 26 in the detection-axis direction is output as the output signal Vo to the apparatus determination circuit 42 via the displacement-amount detection circuit 37 and the angular-velocity signal conversion circuit 38.

In step 5, a subtraction value ΔV is obtained by the subtraction circuit in the apparatus determination circuit 42 by subtracting a predetermined output signal Vof corresponding to the magnitude of the preset pseudo signal Vf from the output signal Vo output from the angular-velocity signal conversion circuit 38.

Further, in step 6, whether the subtraction value ΔV computed in step 5 is within a predetermined range α is determined by the comparator circuit in the apparatus determination circuit 42. When it is determined to be "YES" in this step 6, the process proceeds to step 7 where, assuming that the vibrating body 26 is operating normally, "normal" is displayed on the display unit 43.

On the other hand, when it is determined to be "NO" in step 6, the process proceeds to step 8 where, assuming that the operation of the vibrating body 26 is not normal, "abnormal" is displayed on the display unit 43.

As described above, in this embodiment, when an angular velocity Ω is not applied about the Z axis, the pseudo signal Vf is applied to the corrective-vibration generation section 35, causing the vibrating body 26 to be displaced in the Y-axis direction, thus making the same state as when a Coriolis force is generated. Then, it is possible to diagnose the abnormality of the angular-velocity detection element 21 with respect to the displacement of the vibrating body 26.

Furthermore, in the self-diagnoses in accordance with this embodiment, a determination in steps 1 and 2 of the state in which the angular velocity Ω is not applied may be made by the control unit of, for example, a navigation apparatus after the angular-velocity detection apparatus is connected to the navigation apparatus. In this case, a self-diagnosis can even be performed automatically in accordance with the self-diagnostic signal Vt, making it possible to considerably improve the reliability of the angular-velocity detection apparatus.

Thus, according to this embodiment, since the corrective-vibration generation section 35 for causing the vibrating body 26 to be displaced in the detection-axis direction is provided, it is possible to cause the vibrating body 26 to be displaced in the detection-axis direction by the pseudo signal Vf and to determine the abnormality of the angular-velocity detection element 21.

Although the angular-velocity detection element 21 of each of the above-described embodiments is provided with the corrective-vibration generation sections 35 and 35 on the front and back of the vibrating body 26 and the displacement detection sections 34 and 34 on the right and left of the vibrating body 26 as shown in FIG. 2, the present invention is not limited to this example, and the displacement detection section may be formed of the electrode 29 for corrective vibration on the movable side and the electrode 32 for corrective-vibration on the fixation side, which constitute each corrective-vibration generation section 35 positioned at the front and back of the vibrating body 26, and the corrective-vibration generation section may be formed of the electrode 28 for detection on the movable side and the electrode 31 for detection on the fixation side, which constitute each displacement detection section 34 positioned at the right and left of the vibrating body 26.

Further, although in each of the above-described embodiments the vibration axis and the detection axis are made the X and Y axes, which are two axes in the horizontal direction of the vibrating body 26, the present invention is not limited to this example, and the vibration axis may be made the X axis, the detected axis may be made the Y axis, and the detection axis may be made the Z axis, and further, the vibration axis may be made the Z axis, the detected axis may be made the Y axis, and the detection axis may be made the X axis. In this case, the displacement detection means, the corrective-vibration generation means and/or the vibration generation means may be provided between the vibrating body 26 and the substrate 22.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An angular-velocity detection apparatus, comprising:
a substrate;
a vibratory body provided on the substrate, the vibratory body being capable of displacing in a vibration axis direction and a detection axis direction which intersect at right angles to each other;
vibration generation means for vibrating the vibratory body in the vibration axis direction in response to a driving signal;
displacement detection means for detecting the amount of displacement of the vibratory body when the vibrating body is displaced in the detection axis direction in response to an angular velocity applied about a detected axis intersecting at right angles to the vibration axis and the detection axis and when the vibratory body is vibrated in the vibration axis direction by the vibration generation means; and
corrective-vibration generation means for causing the vibrating body to vibrate for correction in the detection axis direction in response to a correction signal.

2. An angular-velocity detection apparatus according to claim 1, characterized in that:
the correction signal has the same frequency as that of the driving signal and has a phase different from that of the driving signal.

3. An angular-velocity detection apparatus according to claim 2, characterized in that:
the correction signal has an amplitude different from that of the driving signal.

4. An angular-velocity detection apparatus according to claim 1, wherein said vibration generating means comprises:
at least one movable comb-shaped electrode formed on a side of said vibratory body, said movable comb-shaped electrode projecting from said side of said vibratory body; and a fixed comb-shaped electrode formed on said substrate in such a manner that said fixed comb-shaped electrode faces in spaced relationship said movable comb-shaped electrode.

5. An angular velocity detection apparatus according to claim 1, wherein said displacement detection means comprises:
at least one movable comb-shaped electrode formed on a side of said vibrating body, said movable comb-shaped electrode projecting from said side of said vibratory body; and a fixed comb-shaped electrode formed on said substrate in such a manner that said fixed comb-shaped electrode faces in spaced relationship said movable comb-shaped electrode.

6. An angular-velocity detection apparatus according to claim 5, wherein said displacement detection means includes a displacement amount detection circuit for detecting a change in capacitance between said movable and fixed comb-shaped electrodes.

7. An angular-velocity detection apparatus according to claim 1, wherein said corrective vibration generating means comprises:
at least one movable comb-shaped electrode formed on a side of side vibratory body, said movable comb-shaped electrode projecting from said at least one side of said vibratory body; and a fixed comb-shaped electrode formed on said substrate in such a manner that said fixed comb-shaped electrode faces in spaced relationship said movable comb-shaped electrode.

8. An angular-velocity detection apparatus according to claim 1, wherein:
said vibration generating means comprises one movable comb-shaped electrode formed on one side of said vibratory body, said one movable comb-shaped electrode projecting from said one side of said vibratory body; and one fixed comb-shaped electrode formed on said substrate in such a manner that said one fixed comb-shaped electrode faces in spaced relationship said one movable comb-shaped electrode; and
said displacement detecting means comprises another movable comb-shaped electrode formed on another side of said vibratory body, said another movable comb-shaped electrode projecting from said another side of said vibratory body; and another fixed comb-shaped electrode formed on said substrate in such a manner that said another fixed comb-shaped electrode faces in spaced relationship said another movable comb-shaped electrode.

9. An angular-velocity detection apparatus according to claim 8, wherein said corrective vibration generating means comprises:

at least one additional movable comb-shaped electrode formed on said one side of said vibratory body adjacent to said one movable-comb shaped electrode, said additional movable comb-shaped electrode projecting from said at least one side of said vibratory body; and an additional fixed comb-shaped electrode formed on said substrate in such a manner that said additional fixed comb-shaped electrode faces in spaced relationship said additional movable comb-shaped electrode.

10. An angular-velocity detection apparatus according to claim 1, wherein said vibration generating means comprises:

a first movable comb-shaped electrode formed on at least a first side of said vibratory body, said movable comb-shaped electrode projecting from said at least first side of said vibratory body; and a first fixed comb-shaped electrode formed on said substrate in such a manner that said first fixed comb-shaped electrode faces in spaced relationship said first movable comb-shaped electrode; and a second movable comb-shaped electrode formed on a second side of said vibratory body opposite to said first side, said second movable comb-shaped electrode projecting from said second side of said vibratory body; and a second fixed comb-shaped electrode formed on said substrate in such a manner that said second fixed comb-shaped electrode faces in spaced relationship said second movable comb-shaped electrode.

11. An angular-velocity detection apparatus according to claim 1, wherein said displacement detecting means comprises:

a first movable comb-shaped electrode formed on a first side of said vibratory body, said first movable comb-shaped electrode projecting from said first side of said vibratory body; and a first fixed comb-shaped electrode formed on said substrate in such a manner that said first fixed comb-shaped electrode faces in spaced relationship said first movable comb-shaped electrode; and a second movable comb-shaped electrode formed on a second side of said vibratory body opposite to said first side, said second movable comb-shaped electrode projecting from said second side of said vibratory body; and a second fixed comb-shaped electrode formed on said substrate in such a manner that said second fixed comb-shaped electrode faces in spaced relationship said second movable comb-shaped electrode.

12. An angular-velocity detection apparatus according to claim 11, wherein said displacement detection means includes a displacement amount detection circuit for detecting a change in capacitance between said first movable and fixed electrodes and between said second movable and fixed electrodes.

13. An angular-velocity detection apparatus according to claim 1, wherein said vibration detecting means comprises:

a first movable comb-shaped electrode formed on at least a first side of said vibratory body, said movable comb-shaped electrode projecting from said first side of said vibratory body; and a first fixed comb-shaped electrode formed on said substrate in such a manner that said first fixed comb-shaped electrode faces in spaced relationship said first movable comb-shaped electrode; and a second movable comb-shaped electrode formed on a second side of said vibratory body opposite to said first side, said second movable comb-shaped electrode projecting from said second side of said vibratory body; and a second fixed comb-shaped electrode formed on said substrate in such a manner that said second fixed comb-shaped electrode faces in spaced relationship said second movable comb-shaped electrode; and wherein said displacement detecting means comprises:

a third movable comb-shaped electrode formed on a third side of said vibratory body intermediate and orthogonal to said first and second sides, said third movable comb-shaped electrode projecting from said third side of said vibratory body; and a third fixed comb-shaped electrode formed on said substrate in such a manner that said third fixed comb-shaped electrode faces in spaced relationship said third movable comb-shaped electrode; and a fourth movable comb-shaped electrode formed on a fourth side of said vibratory body opposite to said third side, said fourth movable comb-shaped electrode projecting from said fourth side of said vibratory body; and a fourth fixed comb-shaped electrode formed on said substrate in such a manner that said fourth fixed comb-shaped electrode faces in spaced relationship said fourth movable comb-shaped electrode.

14. An angular-velocity detection apparatus according to claim 13, wherein said displacement detection means includes a displacement amount detection circuit for detecting a change in capacitance between said third movable and fixed electrodes and between said fourth movable and fixed electrodes.

15. An angular-velocity detection apparatus, comprising:

a substrate;

a vibratory body provided on the substrate, the vibratory body being capable of displacing in a vibration axis direction and a detection axis direction which intersect at right angles to each other;

vibration generation means for vibrating the vibratory body in the vibration axis direction in response to a driving signal;

displacement detection means for detecting the amount of displacement of the vibratory body when the vibrating body is displaced in the detection axis direction in response to an angular velocity applied about a detected axis intersecting at right angles to the vibration axis and the detection axis and when the vibratory body is vibrated in the vibration axis direction by the vibration generation means;

corrective-vibration generation means for causing the vibrating body to vibrate for correction in the detection axis direction in response to a correction signal; and self-diagnostic means which causes the vibrating body to displace in the detection axis direction by inputting the correction signal and determines whether or not the vibrating body operates normally on the basis of a relationship between the correction signal and the displacement of the vibrating body in the detection axis direction.

16. An angular-velocity detection apparatus, comprising:

a substrate;

a vibratory body provided on the substrate, the vibratory body being capable of displacing in a vibration axis direction and a detection axis direction which intersect at right angles to each other;

vibration generation means for vibrating the vibratory body in the vibration axis direction in response to a driving signal; said vibration generation means comprising:
- a first movable comb-shaped electrode formed on at least a first side of said vibratory body, said first fixed comb-shaped electrode projecting from said first side of said vibratory body; and a first fixed comb-shaped electrode formed on said substrate in such a manner that said first fixed comb-shaped electrode faces in spaced relationship said first movable comb-shaped electrode; and
- a second movable comb-shaped electrode formed on a second side of said vibratory body opposite to said first side, said second movable comb-shaped electrode projecting from said second side of said vibratory body; and a second fixed comb-shaped electrode formed on said substrate in such a manner that said second fixed comb-shaped electrode faces in spaced relationship said second movable comb-shaped electrode;

displacement detection means for detecting the amount of displacement of the vibratory body when the vibrating body is displaced in the detection axis direction in response to an angular velocity applied about a detected axis intersecting at right angles to the vibration axis and the detection axis and when the vibratory body is vibrated in the vibration axis direction by the vibration generation means; said displacement detecting means comprising:
- a third movable comb-shaped electrode formed on a third side of said vibratory body intermediate and orthogonal to said first and second sides, said third movable comb-shaped electrode projecting from said third side of said vibratory body; and a third fixed comb-shaped electrode formed on said substrate in such a manner that said third fixed comb-shaped electrode faces in spaced relationship said third movable comb-shaped electrode; and
- a fourth movable comb-shaped electrode formed on a fourth side of said vibratory body opposite to said third side, said fourth movable comb-shaped electrode projecting from said fourth side of said vibratory body; and a fourth fixed comb-shaped electrode formed on said substrate in such a manner that said fourth fixed comb-shaped electrode faces in spaced relationship said fourth movable comb-shaped electrode; and corrective-vibration generation means for causing the vibrating body to vibrate for correction in the detection axis direction in response to a correction signal, said corrective vibration generation means comprising:
- said fifth movable comb-shaped electrode projecting from said first side of said vibratory body; and
- a fifth fixed comb-shaped electrode formed on said substrate in such a manner that said fifth fixed comb-shaped electrode faces in spaced relationship said first movable comb-shaped electrode, said corrective vibration generation means comprises:
- a fifth movable comb-shaped electrode formed on said first side adjacent to said first movable electrode, said fifth movable comb-shaped electrode projecting from said first side of said vibratory body; and
- a fifth fixed comb-shaped electrode formed on said substrate in such a manner that said fifth fixed comb-shaped electrode faces in spaced relationship said first movable comb-shaped electrode.

17. An angular-velocity detection apparatus according to claim 16, wherein said corrective vibration generating means comprises:
- a sixth movable comb-shaped electrode formed on said second side adjacent to said second movable electrode, said sixth movable comb-shaped electrode projecting from said second side of said vibratory body; and
- a sixth fixed comb-shaped electrode formed on said substrate in such a manner that said sixth fixed comb-shaped electrode faces in spaced relationship said sixth movable comb-shaped electrode.

18. An angular-velocity detection apparatus, comprising:
a substrate;
a vibratory body provided on the substrate, the vibratory body being capable of displacing in a vibration axis direction and a detection axis direction which intersect at right angles to each other;
a vibration generation section for vibrating the vibratory body in the vibration axis direction in response to a driving signal;
a displacement detection section for detecting the amount of displacement of the vibratory body when the vibrating body is displaced in the detection axis direction in response to an angular velocity applied about a detected axis intersecting at right angles to the vibration axis and the detection axis and when the vibratory body is vibrated in the vibration axis direction by the vibration generation section; and
a corrective-vibration generation section for causing the vibrating body to vibrate for correction in the detection axis direction in response to a correction signal.

19. An angular-velocity detection apparatus according to claim 18, characterized in that the correction signal has the same frequency as that of the driving signal and has a phase different from that of the driving signal.

20. An angular-velocity detection apparatus according to claim 19, characterized that the correction signal has an amplitude different from that of the driving signal.

21. An angular-velocity detection apparatus, comprising:
a substrate;
a vibratory body provided on the substrate, the vibratory body being capable of displacing in a vibration axis direction and a detection axis direction which intersect at right angles to each other;
a vibration generation section for vibrating the vibratory body in the vibration axis direction in response to a driving signal;
a displacement detection section for detecting the amount of displacement of the vibratory body when the vibrating body is displaced in the detection axis direction in response to an angular velocity applied about a detected axis intersecting at right angles to the vibration axis and the detection axis and when the vibratory body is vibrated in the vibration axis direction by the vibration generation section;

a corrective-vibration generation section for causing the vibrating body to vibrate for correction in the detection axis direction in response to a correction signal; and a self-diagnostic circuit which causes the vibratory body to displace in the detection axis direction by inputting the correction signal and determines whether or not the vibratory body operates normally on the basis of a relationship between the correction signal and the displacement of the vibratory body in the detection axis direction.

* * * * *